United States Patent
Uemura et al.

(10) Patent No.: US 11,358,289 B2
(45) Date of Patent: Jun. 14, 2022

(54) JOINT STRUCTURE OF INDUSTRIAL ROBOT

(71) Applicant: FANUC CORPORATION, Yamanashi (JP)

(72) Inventors: Norimitsu Uemura, Yamanashi (JP); Masaaki Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/107,206

(22) Filed: Nov. 30, 2020

(65) Prior Publication Data

US 2021/0162611 A1 Jun. 3, 2021

(30) Foreign Application Priority Data

Dec. 3, 2019 (JP) ............................. JP2019-218585

(51) Int. Cl.
*B25J 17/00* (2006.01)
*B25J 19/00* (2006.01)
*F16H 57/04* (2010.01)
*B25J 9/10* (2006.01)

(52) U.S. Cl.
CPC .......... *B25J 17/00* (2013.01); *B25J 19/0054* (2013.01); *B25J 19/0062* (2013.01); *F16H 57/0408* (2013.01); *B25J 9/102* (2013.01)

(58) Field of Classification Search
CPC .... B25J 17/00; B25J 19/0054; B25J 19/0062; B25J 19/102; F16H 57/0408
See application file for complete search history.

(56) References Cited

U.S. PATENT DOCUMENTS

| | | | |
|---|---|---|---|
| 6,335,580 B1* | 1/2002 | Cognigni | F16H 57/027 310/89 |
| 8,858,380 B2* | 10/2014 | Ishizuka | F16H 57/0471 475/159 |
| 9,695,911 B2* | 7/2017 | Uchihara | F16J 13/12 |
| 2005/0133305 A1 | 6/2005 | Okada et al. | |
| 2006/0049159 A1* | 3/2006 | Nihei | B23K 9/1336 219/137.9 |

FOREIGN PATENT DOCUMENTS

| | | |
|---|---|---|
| EP | 1550825 A2 | 7/2005 |
| JP | H02116482 A | 5/1990 |
| JP | 2000220791 A | 8/2000 |
| JP | 2005177914 A | 7/2005 |
| JP | 3977326 B2 | 9/2007 |
| JP | 2014-84999 * | 5/2014 |
| JP | 2015129553 A | 7/2015 |

* cited by examiner

*Primary Examiner* — William C Joyce
(74) *Attorney, Agent, or Firm* — Karceski IP Law, PLLC

(57) ABSTRACT

A joint structure of a robot includes a first member, a second member which is rotatably supported around a horizontal rotation axis line with respect to the first member, and an actuator which rotates the second member with respect to the first member, a through-holes, each of which allows a lubrication space in which a lubricant for the actuator is enclosed to connect with an outer space is provided in at least one of the first member and the second member, and more than three of the through-holes are provided at an interval in a circumferential direction centering around the horizontal rotation axis line.

7 Claims, 10 Drawing Sheets

JOINT STRUCTURE OF INDUSTRIAL ROBOT

CROSS-REFERENCE TO RELATED APPLICATIONS

This application is based on and claims priority to Japanese Patent Application No. 2019-218585 filed on Dec. 3, 2019, the content of which is incorporated herein by reference in its entirety.

FIELD OF THE INVENTION

This invention relates to joint structure of an industrial robot.

BACKGROUND OF THE INVENTION

In a joint axis of an industrial robot, a reducer or the like which decelerates the rotation of a motor so as to obtain necessary torque is arranged. The reducer or the like is arranged in a sealed space, and the sealed space is lubricated by a lubricant which is filled in the space.

The disclosed joint structure of the robot has a greasing port which is provided at a lower portion of the reducer, and a grease discharging port which is provided at an upper portion of the reducer (See Japanese Patent Publication No. 3977326, for example).

SUMMARY OF THE INVENTION

An aspect of the present disclosure is joint structure of a robot which includes a first member, a second member rotatably supported around a horizontal rotation axis line with respect to the first member; and, an actuator which rotates the second member with respect to the first member, wherein, though-holes, each of which allows a lubrication space in which a lubricant for the actuator is enclosed to connect with an outer space is provided in at least one of the first member and the second member, and more than three of the through-holes are provided at an interval in a circumferential direction around the horizontal rotation axis line.

DESCRIPTION OF EMBODIMENT(S) OF THE INVENTION

Joint structure 1 of a robot in accordance with a first embodiment will be described below with reference to the accompanying drawings.

Figure 1:
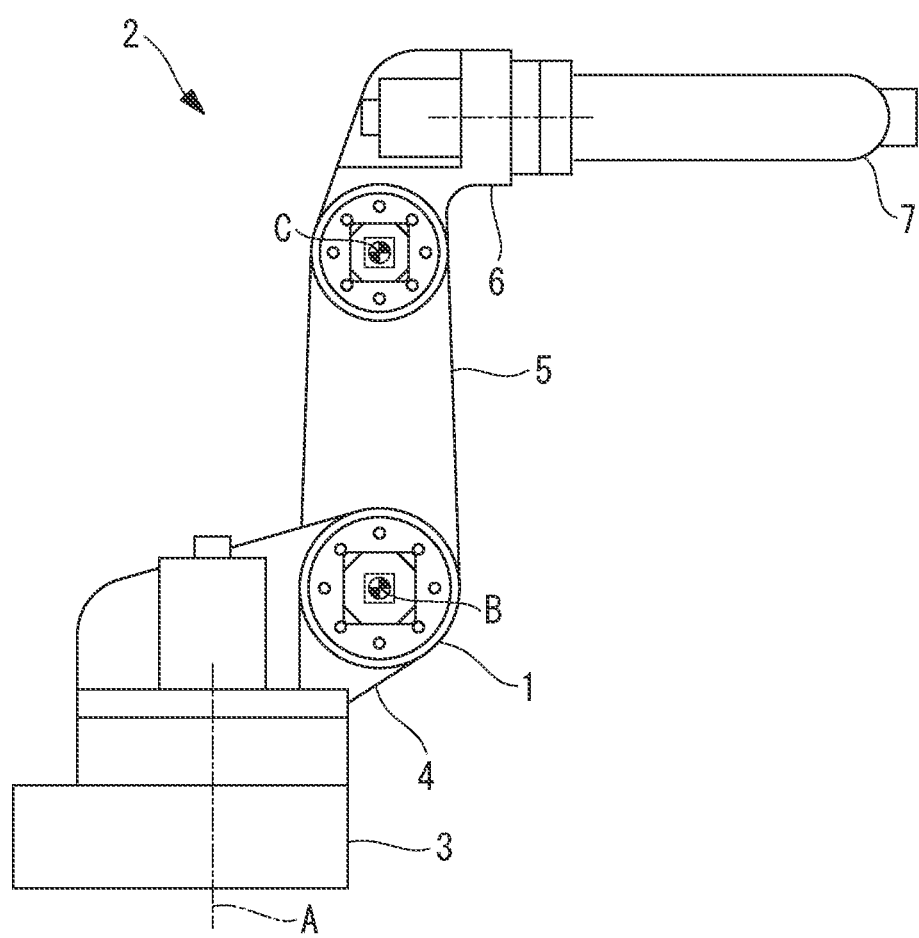
FIG. 1 is a schematic view of a robot having joint structure according to a first embodiment of the present invention.

For example, as shown in FIG. 1, the joint structure 1 according to this embodiment is provided in a six-axis articulated robot 2.

The robot 2 includes a base 3 which is installed on a floor surface, and a turning drum (a first member) 4 which is supported in a rotatable manner with respect to the base 3 and around a vertical first axis line A.

Also, the robot 2 includes a first arm (a second member) 5 which is supported in a swingable manner around a horizontal second axis line B and with respect to the turning drum 4, and a second arm 6 which is supported in a swingable manner around a horizontal third axis line C and with respect to the first arm 5.

Also, a three-axis wrist unit 7 is mounted on a distal end of the second arm 6.

Figure 2:
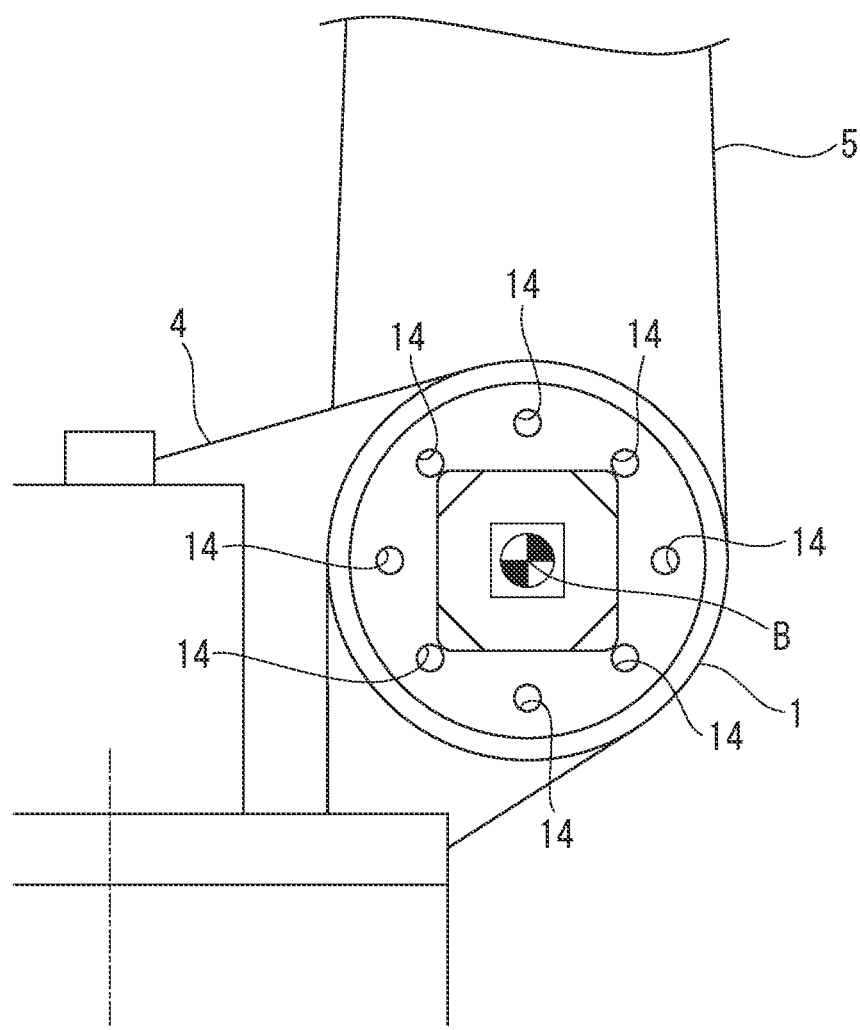
FIG. 2 is a partially enlarged view showing the joint structure of FIG. 1.
Figure 3:
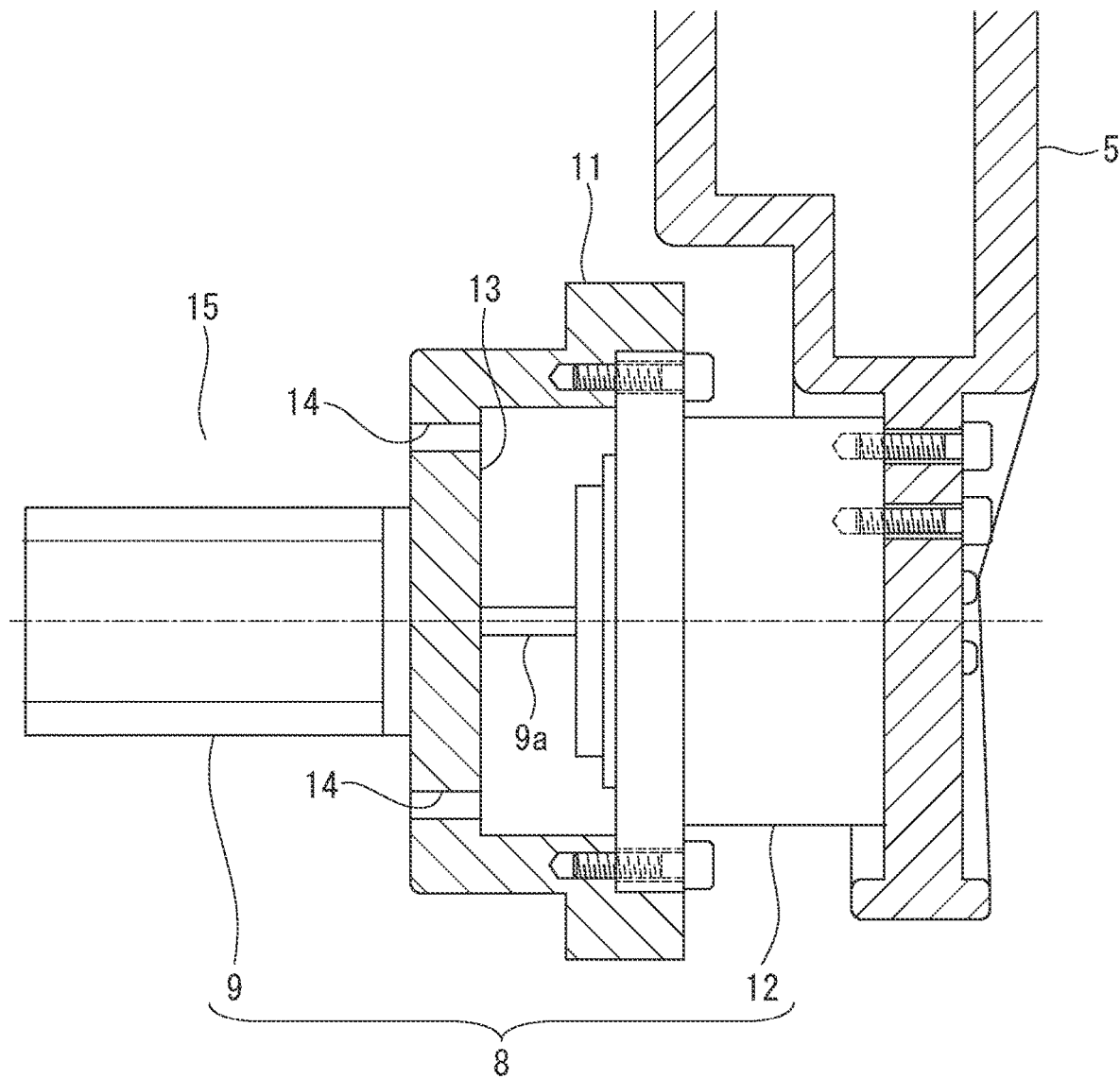
FIG. 3 is a cross-sectional view of the joint structure of FIG. 1.

As shown in FIGS. 2 and 3, the joint structure 1 in accordance with this embodiment includes the turning drum 4, the first arm 5 which is supported in a rotatable manner around the second axis line B and with respect to the turning drum 4, and an actuator 8 which rotates the first arm 5 with respect to the turning drum 4. The actuator 8 includes a servo motor 9 which is attached at the outside of a bracket 11, which composes a part of the turning drum 4, and a reducer 12 which is attached between the inner side of the bracket 11 and the first arm 15.

A lubrication space 13 which is sealed by a seal member, which is not shown, is provided at a position among the bracket 11, the reducer 12, and the first arm 5. An input gear (not shown) which is fixed to a shaft 9a of the servo motor 9, and a lubricant which lubricates parts in the reducer 12 are housed in the lubrication space 13. The reducer 12 decelerates the rotation of the shaft 9a of the servo motor 9 and transmits it to the first arm 5 so as to rotate the first arm 5 with respect to the turning drum 4.

In this embodiment, a plurality of through-holes 14 which communicate between the lubrication space 13 and an outer space 15 are provided in the bracket 11. A female screw for attaching a plug (not shown) is formed in the through-holes 14. The lubricant can be enclosed in the lubrication space 13 by screwing the plug to the female screw so as to block the through-holes 14, and the lubricant can be taken out to the outer space 15 via the through-holes 14 by removing the plug.

The through-holes 14 are formed at eight positions in the bracket 11 at an equal interval in the circumferential direction around the second axis line B so as to be substantially parallel to the second axis line B. Seven of the through-holes 14 among eight of them may be blocked by means of the plugs, and a nipple for greasing may be attached to the remaining one of the through-holes 14.

A function of the joint structure 1 of the robot 2 in accordance with the present embodiment, which is configured as described above, will be explained below.

In response to an angle of an installation surface where the robot 2 having the joint structure 1 in accordance with this embodiment is installed, the nipple is attached to the through-hole 14 which is located at the lowest position at a time when the robot 2 is installed on the installation surface, and the other through-holes 14 are blocked by means of the plugs.

Figure 4:
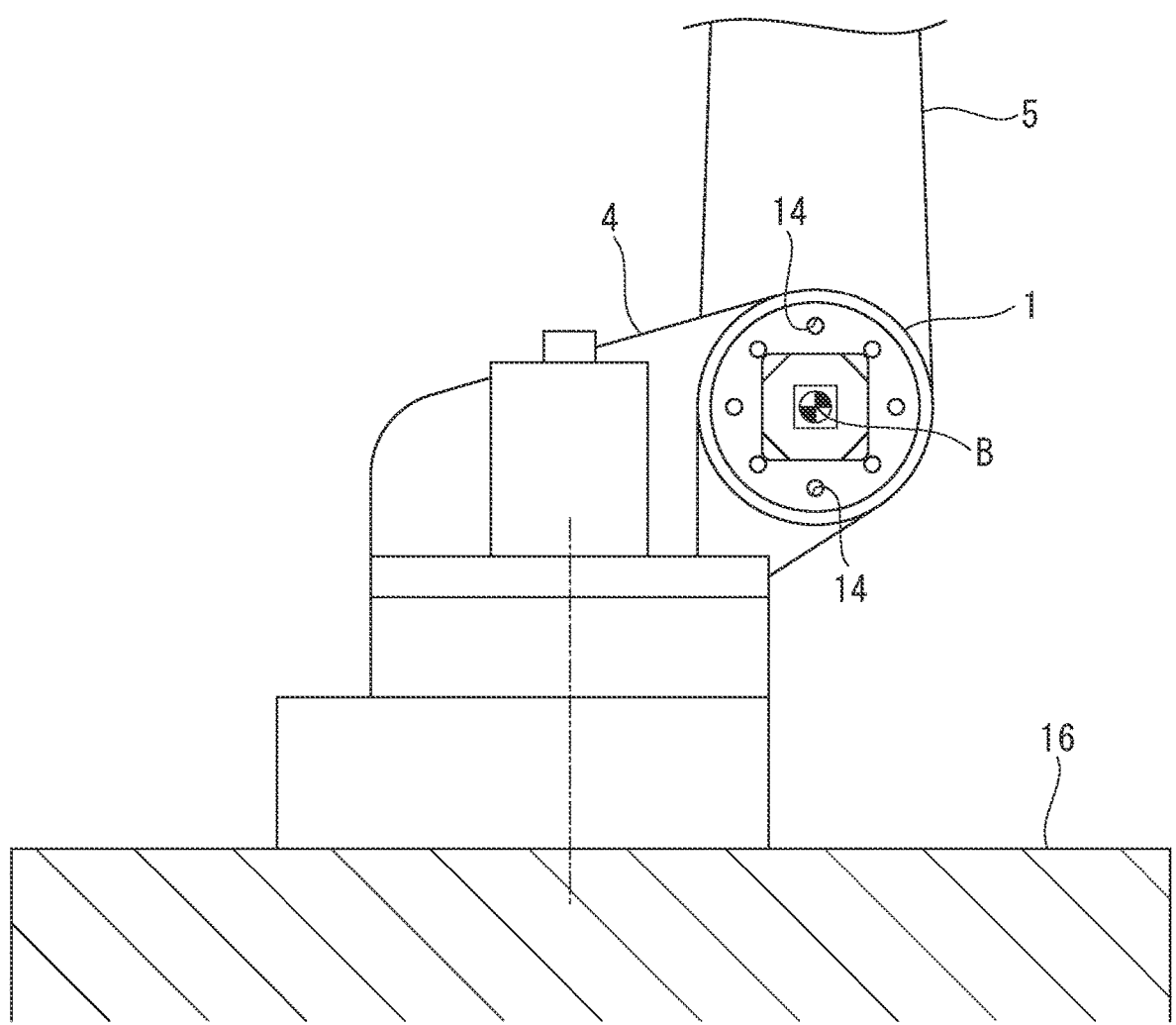
FIG. 4 is a partially enlarged view showing a state in which the robot of FIG. 1 is installed on a horizontal floor surface.

For example, as shown in FIG. 4, in such a case where the robot 2 is installed on a substantially horizontal floor surface 16, the nipple is attached to the through-hole 14 which is located at a position closest to the base 3, and the other through-holes 14 are blocked by means of the plugs.

Figure 5:
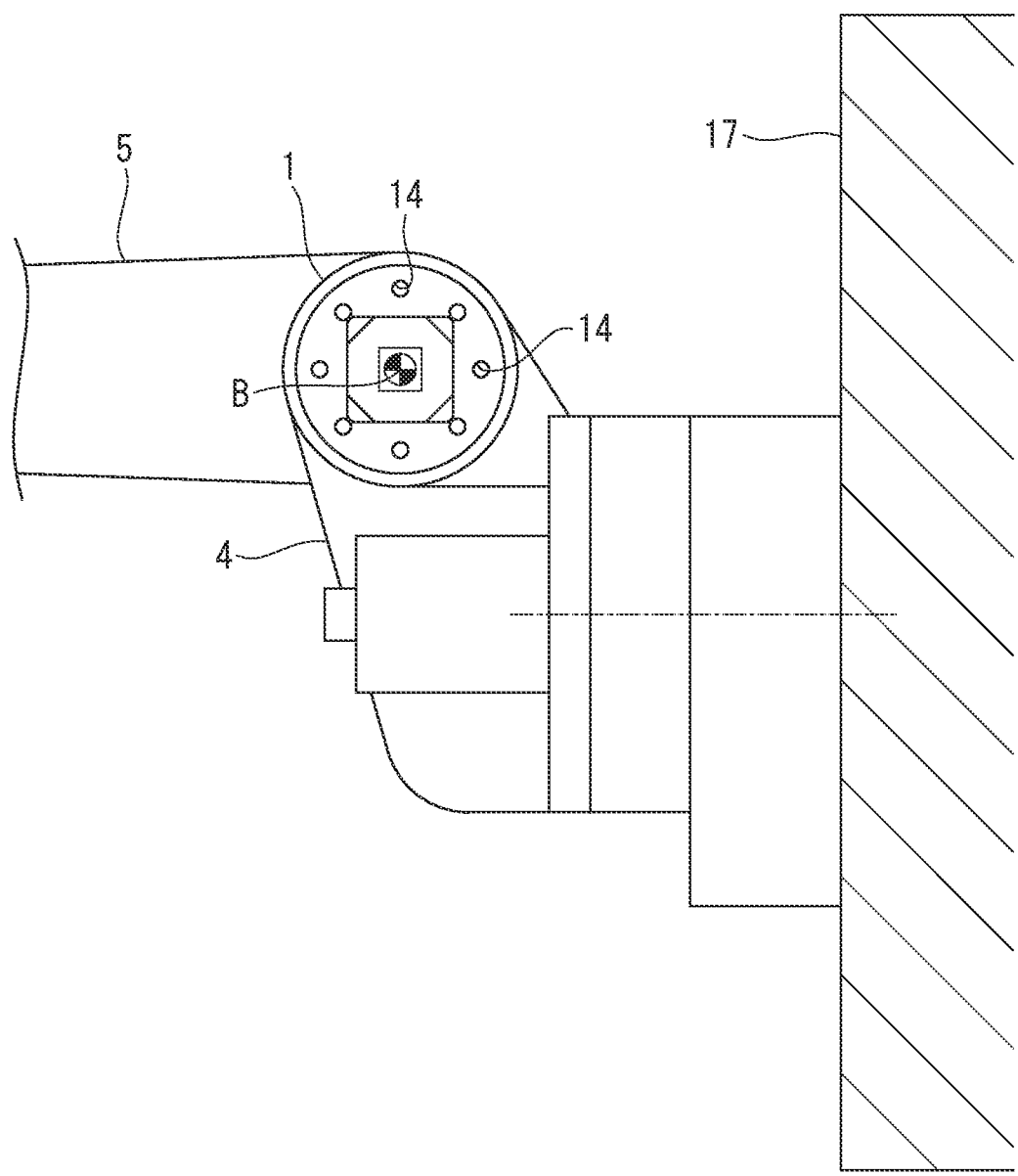
FIG. 5 is a partially enlarged view showing a state in which the robot of FIG. 1 is installed on a vertical wall surface.

On the other hand, as shown in FIG. 5, in such a case where the robot 2 is placed on a substantially vertical wall surface 17, the nipple is attached to the through-hole 14 which is located at the lowest position at a time when the turning drum 4 is placed at an original position, and the other through-holes 14 are blocked by means of the plugs.

Next, the operation for exchanging the lubricant of the joint structure 1 of the robot 2 in accordance with this embodiment will be explained.

As shown in FIG. 4, in such a case where the robot 2 is installed on the substantially horizontal floor surface 16, the plug of the through-hole 14 which is located at the highest position among the eight through-holes 14 is removed, and the lubricant is supplied from the nipple which is attached to the through-hole 14 located at the lowest position.

By this, the new lubricant is filled in the lubrication space 13 from the nipple, and the old lubricant in the lubrication space 13 is pushed from the lower side to the upper side, and the old lubricant is discharged to the outer space 15 via the open through-hole 14 which is located at the highest position. By continuingly performing the greasing via the nipple until the new lubricant is discharged via the through-hole 14, it is possible to exchange the lubricant in the lubrication space 13 to the new lubricant.

In this embodiment, the through-holes 14 are provided at an interval of 45 degrees in the circumferential direction around the second axis line B. Therefore, when the installation angle of the robot 2 is an integer multiple of 45 degrees, it is possible to arrange any one of the through-holes 14 among eight of them at the highest position in the lubrication space 13, and to arrange another one of the through-holes 14 at the lowest position in the lubrication space 13.

On the other hand, there is a possibility that the robot 2 is installed on the installation surface at any degrees. Depending on the installation angle of the robot 2, there may be a case where none of the through-holes 14 are arranged at the highest position and the lowest position in the lubrication space 13.

The above described point will be explained below with reference to FIG. 6.

Figure 6:
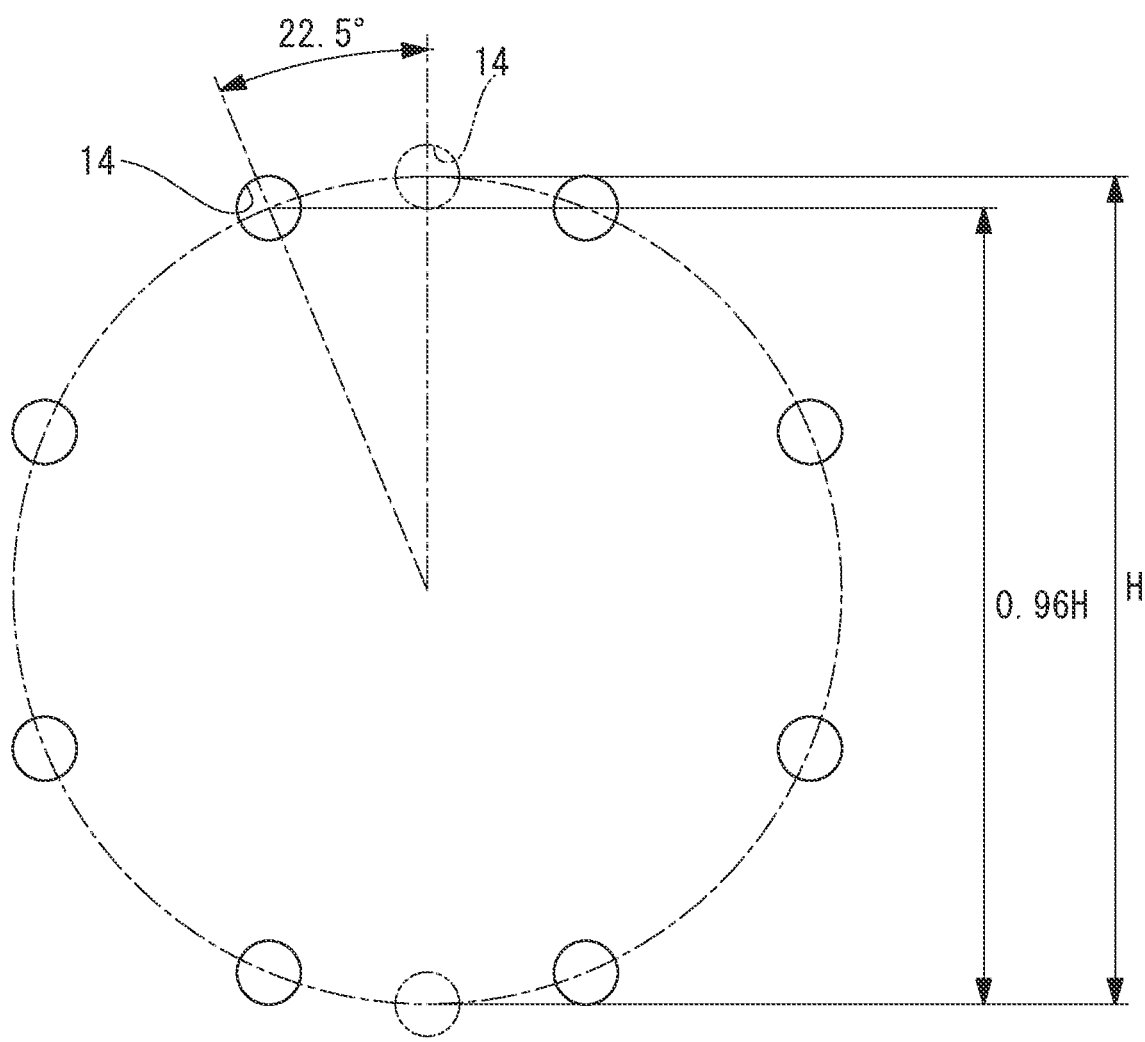
FIG. 6 is a schematic view explaining positions of through-holes at a time when the robot of FIG. 1 is installed on an installation surface which is declined at 22.5 degrees with respect to a horizontal surface.

FIG. 6 shows the positions of the through-holes 14 in such a case where the angle of the installation surface is 22.5 degrees with respect to the horizontal surface (installation angle is 22.5 degrees) with a solid line. Also, for comparison purposes, the through-hole 14 located at the highest position and the through-hole 14 at the lowest position in such a case where the installation surface is in the horizontal manner (installation angle is 0 degree) are shown with a broken line.

According to FIG. 6, in such a case where the installation angle of the robot 2 is 22.5 degrees, the two through-holes 14 which are located at the highest position are arranged side by side in the horizontal direction at a position which is slightly lower than the through-hole 14 which is located at the highest position in such a case where the installation angle is 0 degree. Also, in such a case where the installation angle is 22.5 degrees, the two through-holes 14 which are located at the lowest position are arranged side by side in the horizontal direction at a position which is slightly higher than the through-hole 14 which is located at the lowest position in such a case where the installation angle is 0 degree.

That is to say, in such a case where the installation angle of the robot 2 is 0 degree, any of the through-holes 14 are arranged at the highest position and the lowest position in the lubrication space 13, however, in such a case where the installation angle is an odd multiple of 22.5 degrees, the position of the through-hole 14 at the highest position is located at the lowest level, and the position of the through-hole 14 at the lowest position is located at the highest level when comparing with the case where the installation angle is other than the odd multiple of 22.5 degrees.

However, as shown in FIG. 6, when the height of the through-hole 14 which is located at the highest position in such a case where the installation angle is 0 degree is referred to as H, the height of the through-hole 14 which is located at the highest position in such a case where the installation angle is the odd multiple of 22.5 degrees is 4% lower than the height H, and the through-hole 14 located at the lowest position is arranged at a position which is 4% higher.

Therefore, in accordance with the joint structure 1 of this embodiment, even in a case where the installation angle of the robot 2 is set to be at a voluntary angle, it is possible that the height of the through hole 14 located at the highest position and that of the through-hole 14 located at the lowest position can respectively be arranged within the 4%, which does not largely change the greasing position and the grease discharging position with respect to the lubrication space 13. By this, regardless of the installation angle of the robot 2, the lubricant in the lubrication space 13 can effectively be exchanged, which is advantageous.

Note that, in the above embodiment, the eight through-holes 14 are provided, however, any number of the through-holes 14 can be provided as long as three or more of the through-holes 14 are provided. The more the number of the through-holes 14 are provided, the smaller, in response to the installation angle, the positional change of the through-hole 14 located at the highest position and that of the through-hole 14 located at the lowest position.

Also, in this embodiment, the through-holes 14 are arranged at an equal interval on a single circle centering around the second axis line B, however, instead of this configuration, a plurality of pairs of two through-holes 14, which are provided at positions 180 degrees away from each other around the second axis line B, may be provided so as to be arranged in a biased manner in the circumferential direction. In a case where the installation angle of the robot 2 is limited, it is possible to control the change in the greasing position and that in the grease discharging position in response to the installation angle within the limited range.

Also, in this embodiment, the through-holes 14 are formed in the turning drum 4 around the second axis line B which has a twisted positional relationship with respect to the first axis line A. Therefore, in a case where the turning drum 4 is arranged at a position other than the original position around the first axis line A with respect to the base 3, when the installation angle becomes larger, the greasing position and the grease discharging position are not arranged in an up-and-down manner.

Therefore, in the greasing and the grease discharging operation, the larger the installation angle becomes, the more necessary it becomes to rotate the turning drum 4 in order to arrange the second axis line B in a horizontal manner as much as possible.

Figure 7:
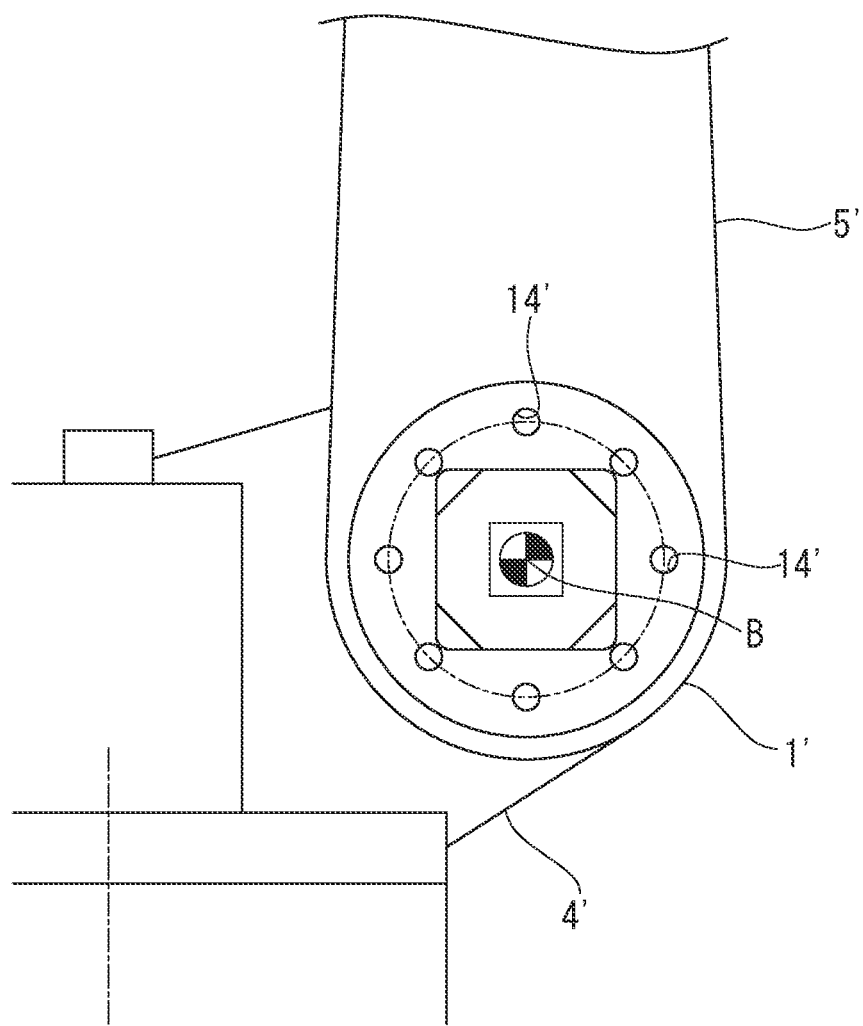
FIG. 7 is a partially enlarged view showing a modified example of the joint structure of FIG. 2.
Figure 8:
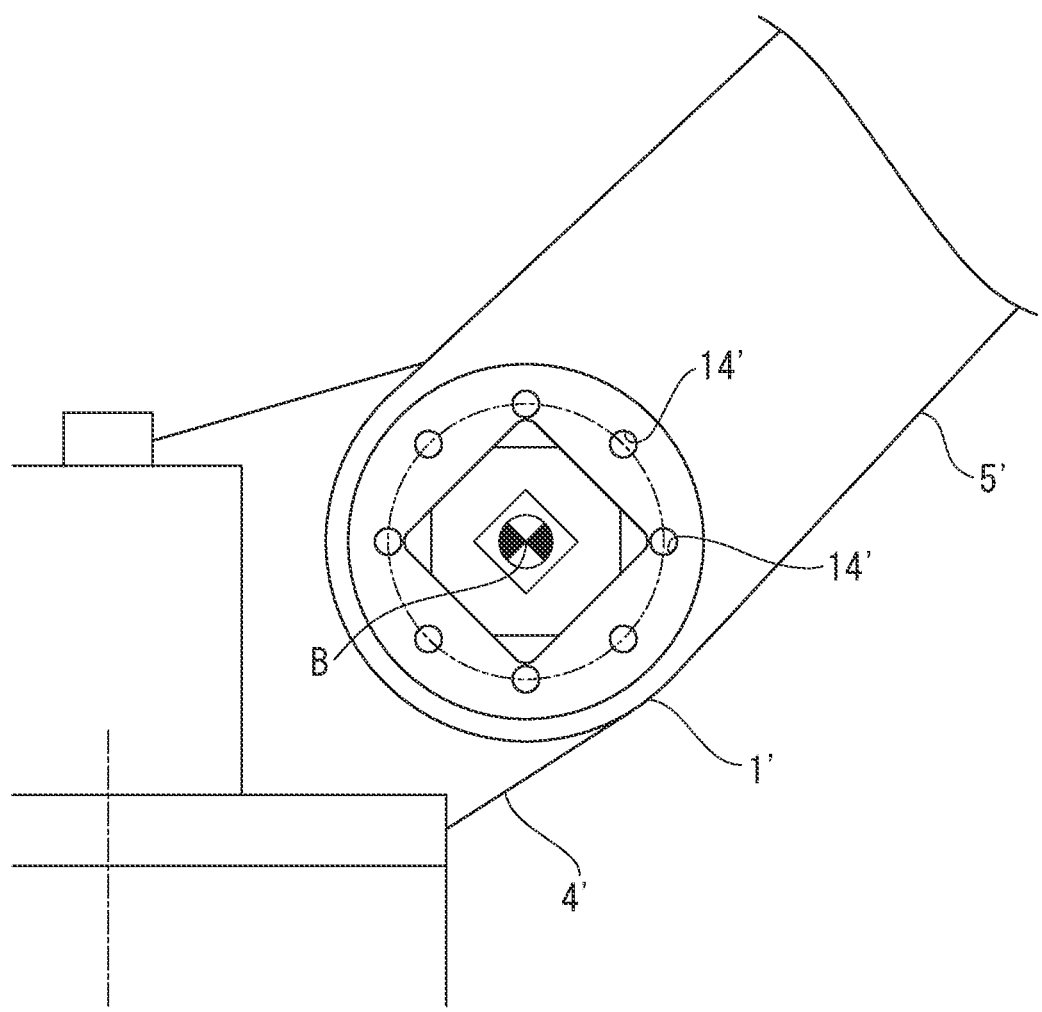
FIG. 8 is a partially enlarged view showing a state in which an angle of an arm is changed in the joint structure of FIG. 7.

Also, in this embodiment, the through-holes 14 are provided in the turning drum 4, however, instead of this configuration, as shown in FIGS. 7 and 8, the through holes 14 may be formed in a first arm 5'.

In an example shown in FIGS. 7 and 8, eight through-holes 14' are formed in the first arm 5' at an equal interval in the circumferential direction around the second axis line B. As shown in FIGS. 7 and 8, each time an angle of the first arm 5' around the second axis line B is changed by the integer multiple of 45 degrees, the through-holes 14' are arranged at the same phase.

Also, each time the position of the first arm 5' is changed by the odd multiple of 22.5 degrees, difference between the height of the through-holes 14' located at the highest position and those of the through-holes 14' located at the lowest position becomes the smallest, but the change in the height is very slight. Accordingly, in this joint structure 1' as well, it is possible to perform the greasing and the grease discharging operation effectively regardless of the angle of the first arm 5'.

In this case also, in a case where the installation angle of the robot 2 is other than 0 degree, at the time of performing the greasing and the grease discharging operation, it is necessary to rotate the turning drum 4 in order to arrange the second axis line B in the horizontal manner as much as possible, however, it is not necessary to change the angle of the first arm 5'. For example, in a case where a large tool is attached at a distal end of the wrist or the like, it is not necessary to operate the arm while avoiding contact with the tool and the other members at the time of performing the greasing and the grease discharging operation, which is advantageous.

Figure 9:
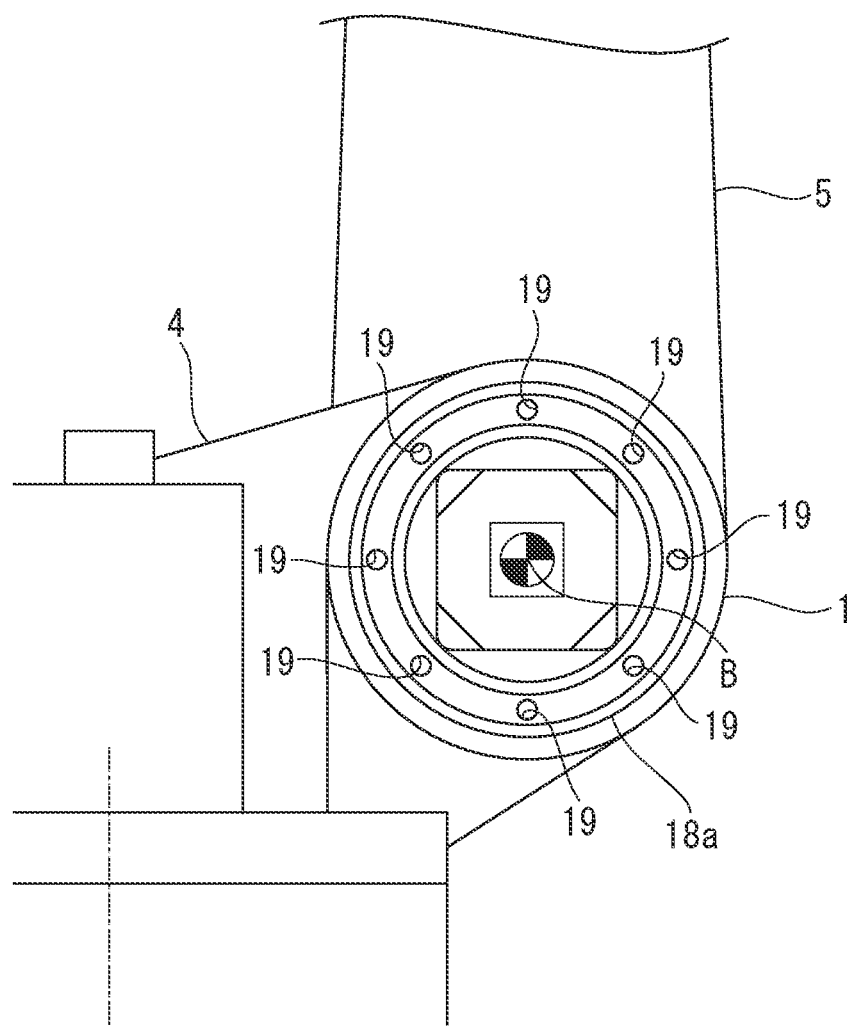
FIG. 9 is a partially enlarged view showing another modified example of the joint structure of FIG. 2.
Figure 10:
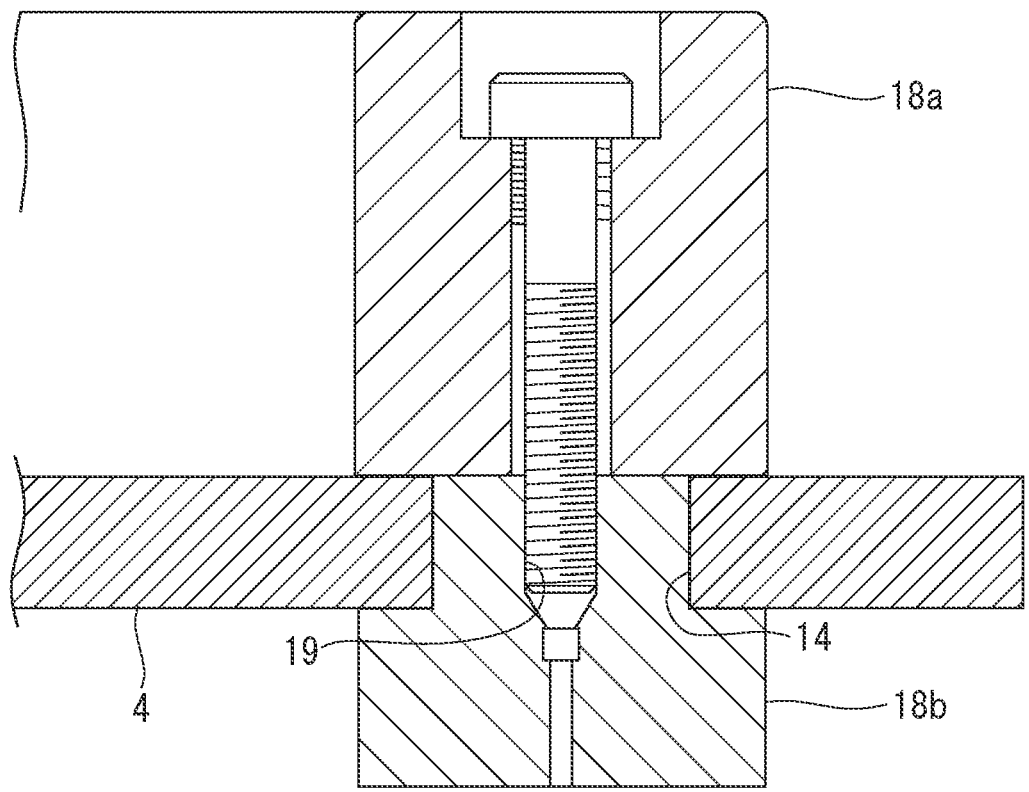
FIG. 10 is an enlarged cross-sectional view showing a part of the joint structure of FIG. 9.

Also, as shown in FIGS. 9 and 10, at least one of the through-holes 14, which are provided in the bracket 11, may be used to attach heat radiating members 18a, 18b at the inside and the outside of the lubrication space 13.

That is to say, as shown in FIGS. 9 and 10, the bracket 11 is arranged between the heat radiating members 18a, 18b which are in a ring shape, and the heat radiating members 18a, 18b are arranged so as to be at the inside and the outside of the lubrication space 13. For example, a boss which is engaged with the through-holes 14 of the bracket 11 is provided in the heat radiating member 18b which is arranged at the inside of the lubrication space 13, and a screw hole 19 is formed in the boss.

And, bolts, which are inserted into the through-holes 14 provided in the heat radiating member 18a located at the outside, are inserted into the screw holes 19 in the heat radiating member 18b at the inside so that the heat radiating members 18a, 18b are fixed in a closely contacted state. The heat radiating members 18a, 18b are made of a material having high thermal conductivity such as aluminum, tungsten, molybdenum, or the like, for example.

By this, the heat of the lubrication space 13 and that of the lubricant are dissipated to the outer space 15 via the heat radiating members 18a, 18b, so that it is possible to cool the lubrication space 13 and the lubricant.

By this, it is possible to fix the heat radiating members 18a, 18b by means of the bolts, and it is possible to use the two screw holes 19 which are arranged in an up-and-down relationship in a vertical direction as a greasing port and a grease discharging port by removing the bolts from the two screw holes.

In this case, screw holes are formed in through-holes in the heat radiating member 18a at the outside, and through-holes are formed in the heat radiating member 18b at the inside, and therefore, with respect to the through-hole which is used for performing the greasing operation, the bolt can be removed, and a nipple can be attached to the screw hole in the heat radiating member 18a at the outside. Also, with respect to the through-hole which is used for performing the grease discharging operation, the bolt can be removed so as to open the through-hole in the heat radiating member 18b at the inside.

With this configuration, by preventing an excessive rise in temperature of the lubricant, it is possible to suppress aged deterioration of the lubricant, which leads to extend replacement cycle of the lubricant.

Also, in the above described embodiment, the joint structure 1 of the robot 2 is shown as an example, however, instead of this, the configuration in the above described embodiment may be applied to joint structure 1 which is driven around another horizontal rotational axis. For example, the above described configuration may be applied to joint structure 1 having a first arm 5, a second arm 6 which rotates around a third axis line C, and an actuator 8.

Also, the through-hole 14 is used one by one as each of the greasing port and the grease discharging port, however, it is not limited thereto, and a plurality of through-holes 14 may be used for at least one of the greasing port and the grease discharging port.

The invention claimed is:

1. A joint structure of a robot comprising:
a first member;
a second member rotatably supported around a horizontal rotation axis line with respect to the first member;
an actuator which rotates the second member with respect to the first member,
wherein, though-holes, each of which allows a lubrication space in which a lubricant for the actuator is enclosed to connect with an outer space, are provided in at least one of the first member and the second member, and
wherein more than three of the through-holes are provided at an interval in a circumferential direction around the horizontal rotation axis line;
a first heat radiating member arranged outside of the lubrication space; and
a second heat radiating member arranged inside of the lubrication space,
wherein the first heat radiating member is connected to the second heat radiating member using at least one of the through-holes, and
wherein the second heat radiating member is ring-shaped and extends entirely around the horizontal rotation axis line.

2. The joint structure of the robot according to claim 1, wherein the through-holes are arranged at an equal interval.

3. The joint structure of the robot according to claim 1, wherein,
a plurality of pairs of the through-holes are provided, and,
each pair of the through-holes are arranged at positions 180 degrees away from each other around the horizontal rotation axis line.

4. The joint structure of the robot according to claim 1, wherein the first member is fixed to an installation surface, and
the through-holes are provided in the first member.

5. The joint structure of the robot according to claim 1, wherein the through-holes are provided in the second member.

6. The joint structure of the robot according to claim 1, wherein a female screw is provided in each of the through-holes.

7. The joint structure of the robot according to claim 1, wherein
at least one of the first and second heat radiating members are provided with a screw hole for making a connection between the lubrication space and the outer space.

\* \* \* \* \*